March 14, 1944.　　　E. A. DEWALD　　　2,343,890
TUBE EXPANDER
Filed Oct. 7, 1939　　　6 Sheets-Sheet 1
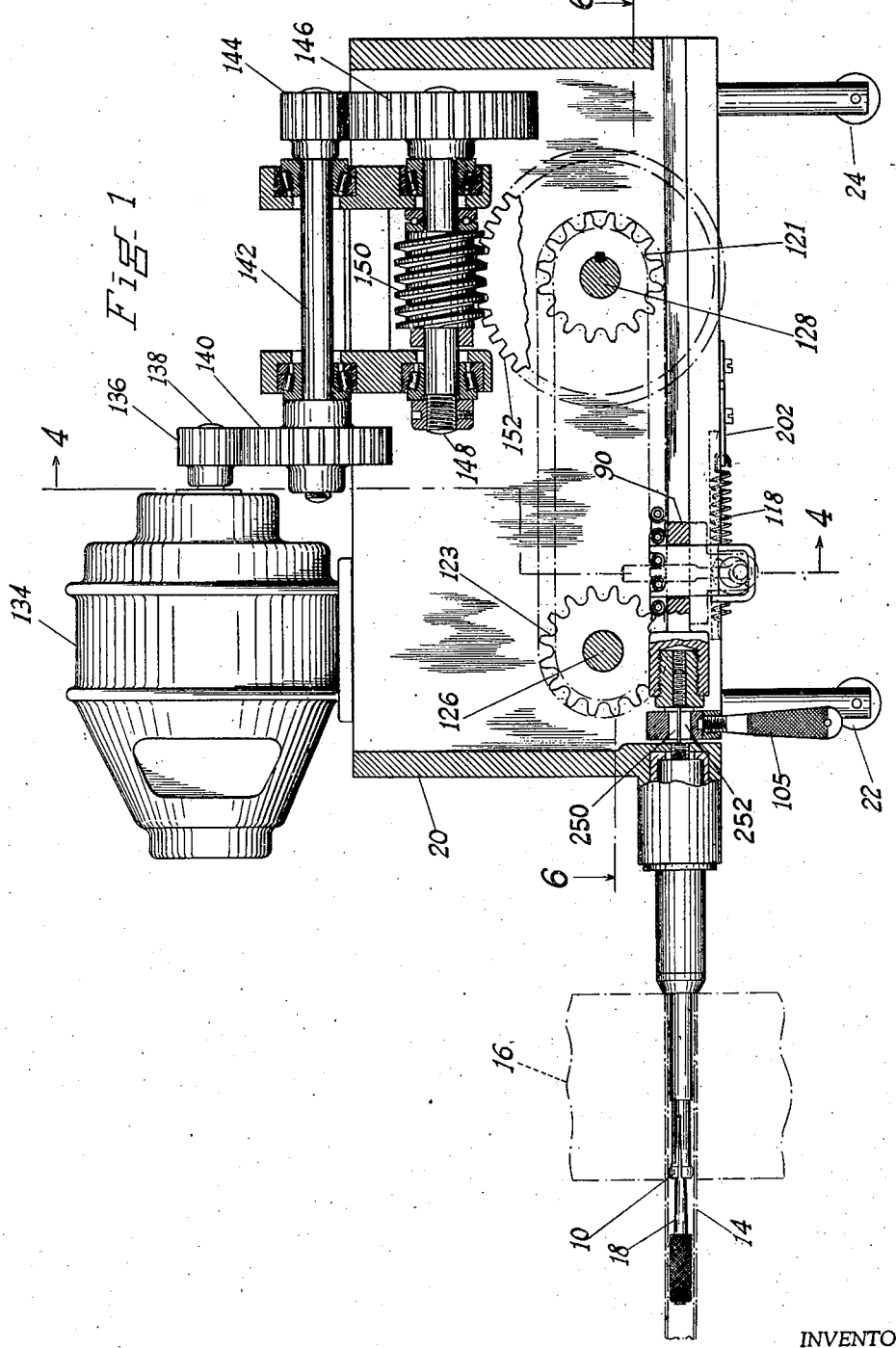
INVENTOR.
Edward A. Dewald
BY
ATTORNEY.

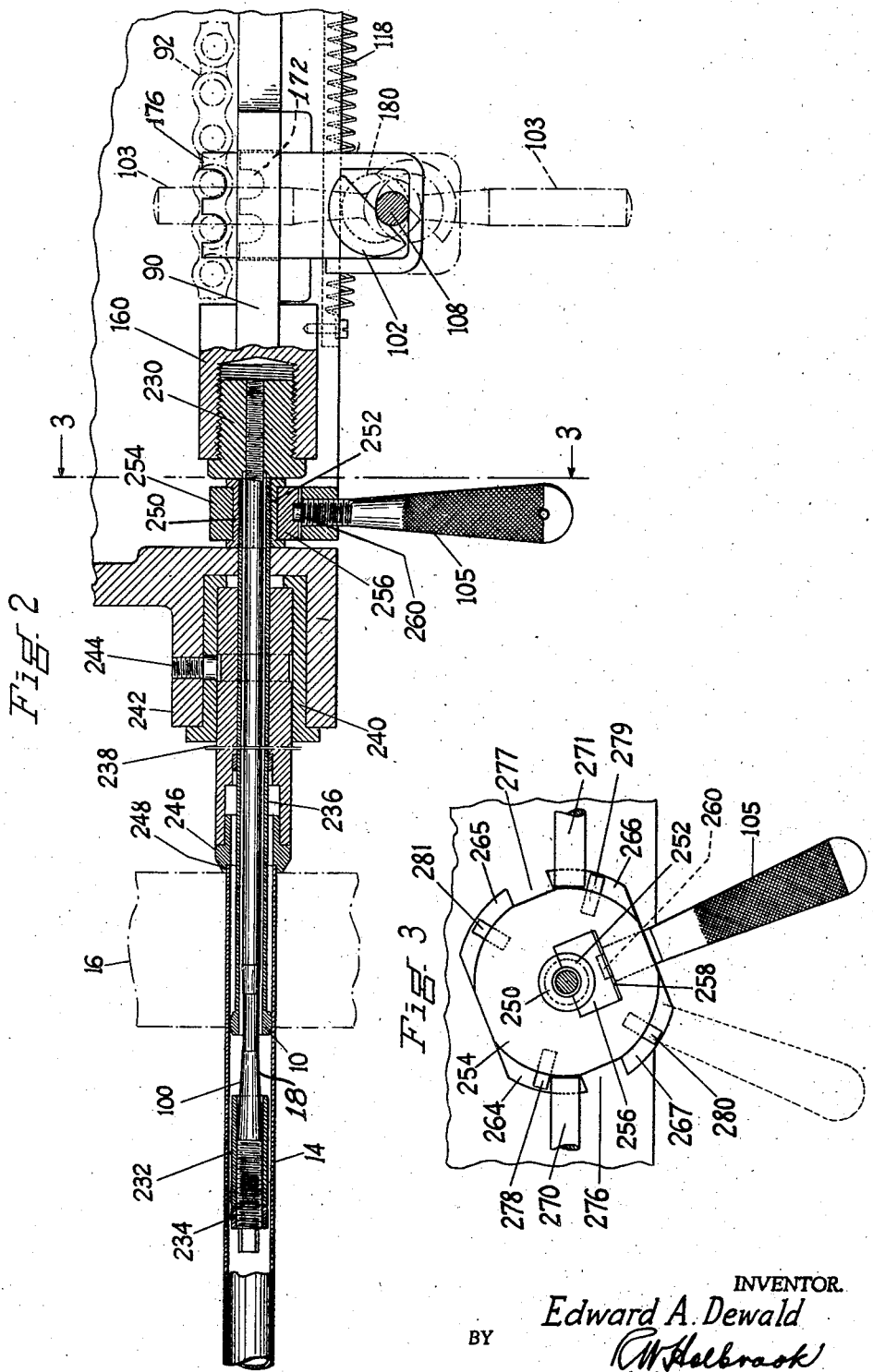

March 14, 1944.   E. A. DEWALD   2,343,890
TUBE EXPANDER
Filed Oct. 7, 1939   6 Sheets-Sheet 3
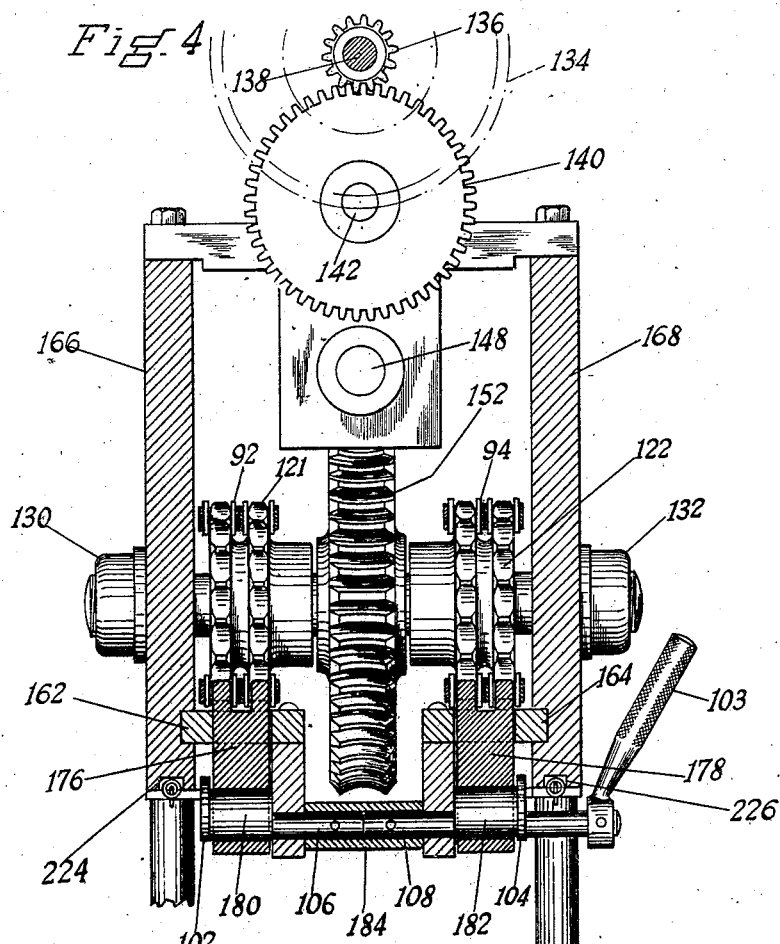
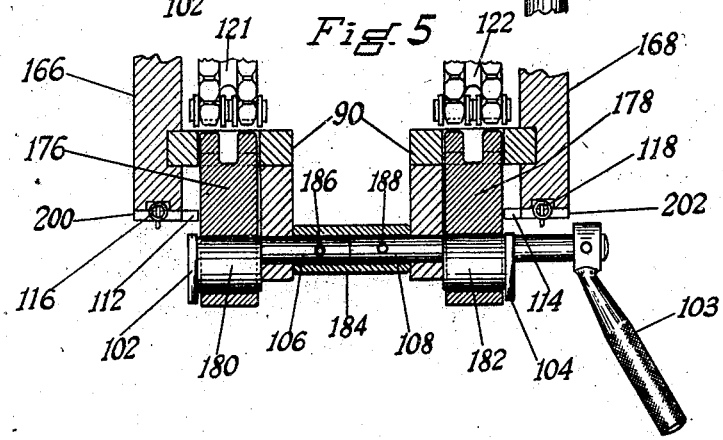
INVENTOR.
Edward A. Dewald
BY *W. Holbrook*
ATTORNEY.

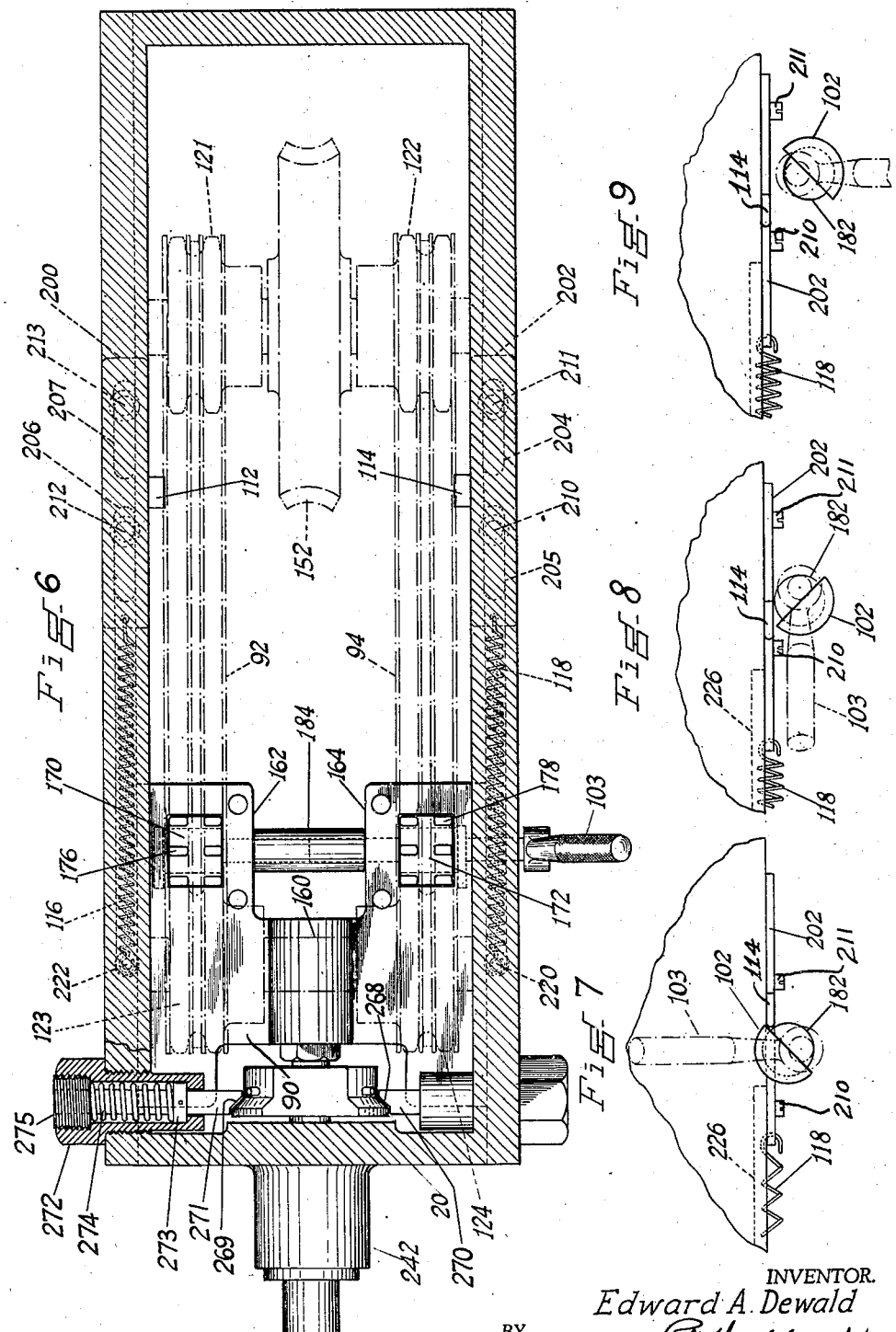

March 14, 1944.  E. A. DEWALD  2,343,890
TUBE EXPANDER
Filed Oct. 7, 1939   6 Sheets-Sheet 5
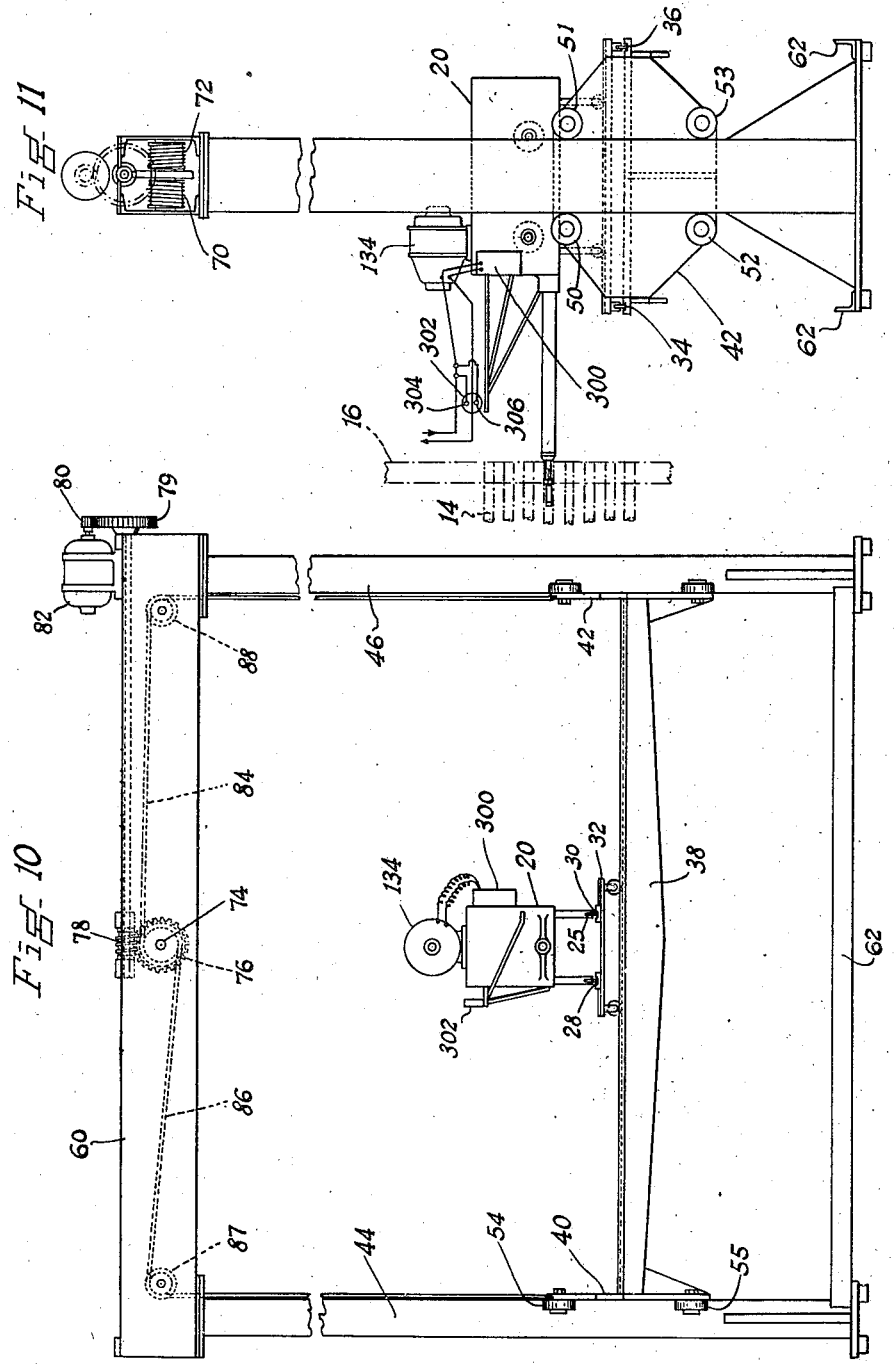
INVENTOR.
Edward A. Dewald
BY
R.W. Holbrook
ATTORNEY.

Patented Mar. 14, 1944

2,343,890

UNITED STATES PATENT OFFICE 2,343,890

TUBE EXPANDER

Edward Alexander Dewald, Massillon, Ohio, assignor, by mesne assignments, to The Babcock & Wilcox Company, Newark, N. J., a corporation of New Jersey Application October 7, 1939, Serial No. 298,345

14 Claims. (Cl. 153—80.5)

This invention relates to manufacture in which tubular elements are expanded so as to join them with other co-operating elements positioned externally thereof.

The invention is also concerned with devices in which expanded tube seat connections are employed, and the invention covers a pull type expander for making such connections.

The invention also relates to a novel method of producing expanded tube seat connections in which the direction of the expanding pull is in alignment with the longitudinal axes of the tubular elements which are expanded.

The invention is also concerned with a method which produces pressure-tight tube seat connections without imposing undesirable residual stresses upon the operative parts of the tubes employed. For example, the method carried out by the apparatus of this invention is advantageously employed in the manufacture of fluid heat exchange apparatus of the convection type. Such apparatus involves a plurality of spaced tubes fixed to one tube seat or drum wall at their inlet ends and fixed to another tube seat or drum wall at their outlet ends. Such tubes normally conduct one heat exchange fluid through another at a different temperature, and the operating temperatures and pressures are often of high degree.

With the method effected by the apparatus of this invention, portions of the tube wall throughout the length of the tube seat are subjected to the same predetermined working, and the stressing of the tube metal is confined to the tube length within the tube seat.

When the invention is employed in the manufacture of the above indicated apparatus the tubes are also uniformly secured to the tube sheet or drum wall in pressure-tight relationship, and the main portions of the tubes are not bowed by longitudinal compression stresses. Furthermore, none of the tubes are put in compression by the expanding operations.

The invention will be described with reference to the accompanying drawings in which an illustrative embodiment of the apparatus is shown.

In the drawings:

Fig. 1 is a vertical section of the pull type expander whereby the split expander head 10 is pulled through the portion of the tube 14 within the tube sheet 16 to form a pressure-tight connection between the tube and the tube sheet;

Fig. 2 is a vertical section showing parts of the Fig. 1 expander in greater detail;

Fig. 3 is a detail view showing the depth gage lever structure whereby the longitudinal extent of the expander head into the tube is determined and varied;

Figure 12:
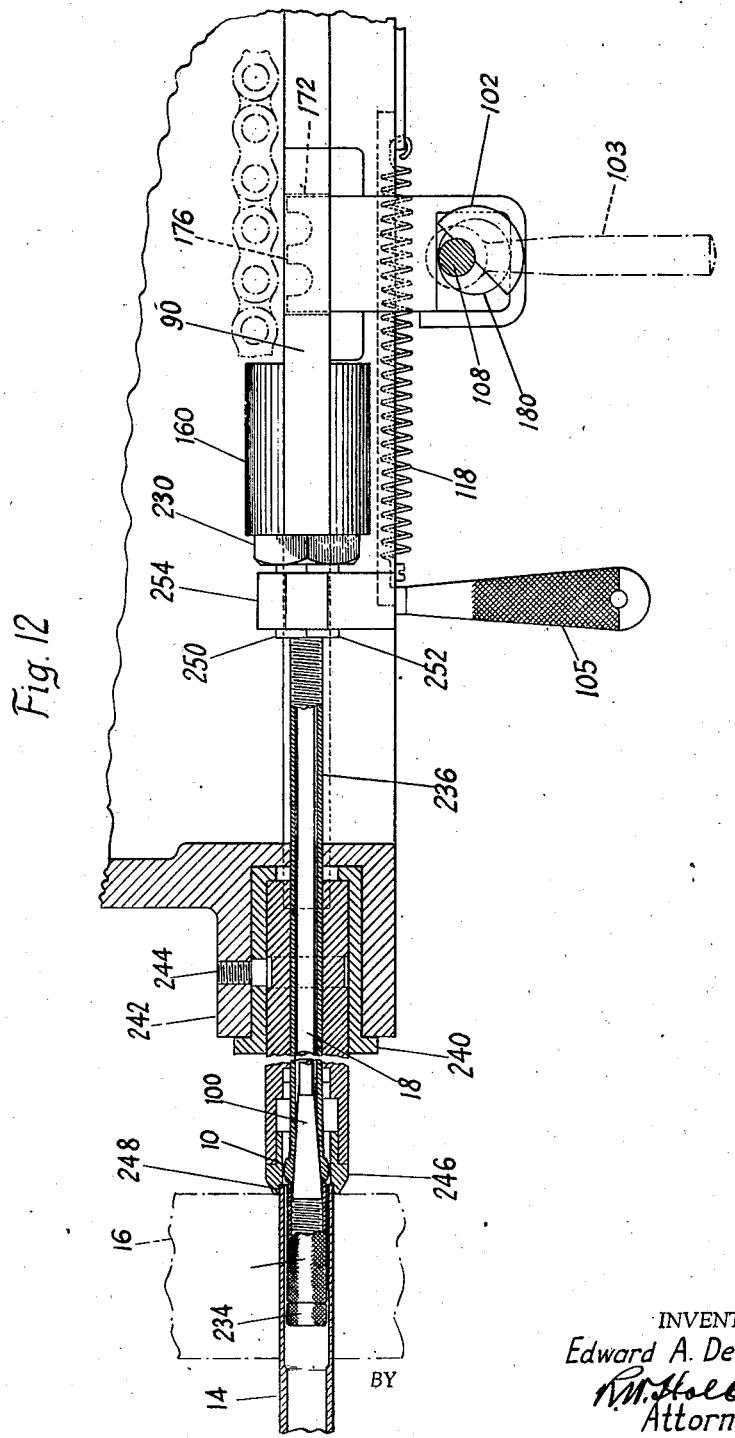

Fig. 4 is a vertical transverse section on the broken section-line 4—4 of Fig. 1, showing the mechanism whereby the pulling cross head is clutched to the motor driven chains for pulling the expander mandrel 18 and the expander head 10 through the tube seat;

Fig. 5 is a vertical sectional view of the clutching mechanism indicated in Fig. 4, with the pulling cross head unclutched from the pulling chains;

Fig. 6 is a horizontal section on the plane of the line 6—6 of Fig. 1;

Fig. 7 is a detail view illustrating the initial engagement of the clutch disengaging cam with the unclutching trip when the expander is about to emerge from the end of the tube;

Fig. 8 is a view similar to Fig. 7 but illustrating the effect of the disengaging latch and its connected spring on the disengaging cam to unclutch the pulling cross head from the pulling chain;

Fig. 9 is a detail view showing the clutch lever and its cam moved entirely to their clutch disengaging positions;

Fig. 10 is a front elevation showing the expander supporting frame and the means for raising or lowering the expander to the horizontal plane of the axes of the tubes to be expanded;

Fig. 11 is an end elevation of the expander and its supporting frame indicated in Fig. 10; and Fig. 12 is a vertical section similar to Fig. 2 showing the apparatus immediately after completion of the expanding operation.

The expander illustrated in Fig. 1 of the drawings is mounted on a carriage which consists of a box-like frame 20 supported by the rollers 22—26 so that the expander is freely movable in the trackways 28 and 30 fixed to the secondary carriage 32. The secondary carriage is in turn supported by rollers which are freely rotatable in the main trackways 34 and 36 which extend at right angles to the trackways 28 and 30. These main trackways are fixed to a transverse frame which includes the beam 38 and the end plates 40 and 42. The latter are guided vertically against the columns 44 and 46 by rollers 50—55.

The columns 44 and 46 are connected at their upper ends by the beam structure 60, and at their lower ends by the members 62. With the expander supported as indicated in Fig. 11, a tubular heat exchanger with the ends of its tubes 14 disposed within tube seats in a tube sheet 16 is moved to a position adjacent the expander and the exchanger is adjusted so that the longitudinal axes of the tubes will be parallel with the longitudinal axes of the expander mandrel 18 and its associated parts, as indicated in Fig. 11.

After the heat exchanger is brought into its operative position the expander is so raised or lowered that the axes of the expander mandrel and its associated parts are at the same level as the axes of some of the tubes. This is accomplished by the operation of hoisting mechanism which includes the winding drums 70 and 72 mounted upon the shaft 74 and operated through the gearing 76, 78, 79, and 80 of the motor 82. Cables 84 and 86 are fastened to the winding drums and they extend therefrom around pulleys 87 and 88 to the frame plates 40 and 42.

After the expander is properly positioned as indicated above, the operator moves the expander frame 20 longitudinally of the frame 38 until the axis of the expander is co-incident with the axis of the tube. Thereafter, the operator moves the expander along the trackways 28 and 30 until the operative parts are associated with the tube sheet 16 and the tube 14 in the manner indicated in Fig. 1 of the drawings.

The actual expanding operation is initiated by clutching the pulling cross head 90 to the driven sprocket chains 92 and 94 so that the expander mandrel 18 is caused to advance, expand the sections of the expander head 10, and then move the expanded sections through that portion of the tube within the tube seat. For this purpose the forward end of the mandrel is fixed with reference to the cross head and a rearward portion of the mandrel is provided with a conically tapered section 100.

As the expander head 10 approaches the end of the tube, the de-clutching cams 102 and 104 (fixed upon the eccentric shafts 106 and 108) engage the spring-held latch projections 112 and 114 and carry the latter forwardly until the expander head is disengaged from the tube. By that time the latch springs 116 and 118 are so tensioned that the frictional engagement between the clutch members and the driven chains 92 and 94 is overcome by the pull of the springs and the cams 102 and 104 and the clutch lever 103 are moved from their chain clutching positions indicated in Fig. 7, through positions indicated in Fig. 8 and immediately to the positions indicated in Fig. 9 wherein the cross head 90 is de-clutched from the chains 92 and 94. Thereupon, the expander is moved away from the tube sheet 16 to an extent sufficient to permit the mandrel to be moved rearwardly so that it is related to the expander head in the manner shown in Figs. 1 and 2. Then, the expander is moved laterally along the trackways 34 and 36 and the entire operation is repeated. Since the expander is movable transversely and vertically with respect to the tube sheet, as well as in the direction of the axes of the tubes, the mounting is considered to be full floating, or universal.

The pulling chains 92 and 94 are trained around double sprockets 121—124. Two of these sprockets are mounted upon the shaft 126 and the remaining sprockets are fixed to the shaft 128. These shafts are preferably mounted in anti-friction bearings such as those indicated at 130 and 132 in Fig. 4 of the drawings.

The pulling chains are driven by a motor 134 through reduction gearing which is shown in Figs. 1 and 4. This gearing includes the pinion 136 fixed to the motor shaft 138 and directly meshing with a driven spur gear 140 fixed to the counter-shaft 142. This counter-shaft has also fixed thereto a driving pinion 144 meshing with a driven spur gear 146 fixed to a shaft 148 which carries a worm gear 150. This worm gear drives a worm wheel 152 which is fixed to the shaft 128 between the double sprockets 121 and 122.

The cross head 90 which is selectively clutched to the pulling chains to effect the expanding operation is shown in plan in Fig. 6, and in vertical section in Figs. 4 and 5. It includes a counter-bored and internally screw-threaded middle portion 160 in the nature of a cylindrical block. This block is rigid or integral with the side portions or wings 162 and 164. These wings extend into horizontal guideways formed in the side members 166 and 168 of the expander frame 20 as indicated in Figs. 4 and 6 of the drawings. These guideways preferably extend throughout the length of the frame 20 in order to cover the full travel of the cross head.

The wings 162 and 164 extend forwardly of the block 160 and their forwardly extending portions are formed with openings 170 and 172 through which the chain clutching members 176 and 178 may be vertically moved in order to connect the cross head to the chains 92 and 94 or disconnect it therefrom.

The clutching members 176 and 178 are provided at their lower portions with circular openings to receive the eccentrics 180 and 182. These eccentrics are fixed, respectively, to the eccentric shafts 106 and 108 which are preferably connected by the sleeve 184 and the pins 186 and 188 so that they move in unison.

The clutch disengaging cam 102 is fixed to the shaft 106 adjacent the outer surface of the eccentric 180 (see Fig. 5) and the similar cam 104 is fixed to the shaft 108 adjacent the eccentric 182.

The clutching members 176 and 178 are moved from their inoperative positions as indicated in Fig. 5 to their clutching positions shown in Fig. 4 by the manual movement of the clutch lever 103 upwardly from the position at which it is shown in Fig. 5. This movement causes the clutch disengaging cams 102 and 104 to be brought into such positions that the clutch disengaging latches 112 and 114 extend into the paths of movement of those cams.

The clutch disengaging latches 112 and 114 are in the form of projections extending inwardly from the latch plates 200 and 202, as indicated in dotted lines in Fig. 6. These plates are formed with longitudinal slots 204—207 in order to permit the plates to be freely slidable with respect to the headed members 210—213 which hold the plates in position beneath the side members of the expander frame 20. Each one of these plates is secured to a coiled spring as previously indicated and these springs 116 and 118 are anchored at their rearward ends by the members 220 and 222 to the side members of the expander frame 20.

The springs may be also partly disposed within the upwardly extending grooves or recesses 224 and 226 formed in the lower edges of the side members of the frame 20, as indicated in Figs. 4 and 5 of the drawings.

The expander mandrel 18 is in the nature of a long rod which is anchored at its forward end within the cross head block 160. This is accomplished by screw-threading the forward end of the mandrel into a sleeve or nut 230, which is in turn screw-threaded into the counter-bore within the block 160, as indicated in Fig. 2 of the drawings. A rearward portion 100 of the mandrel is formed as a tapered and conical portion in order to operatively expand the split expander head 10, and the extent of radial expansion of the segments of the expander head is controlled by the position of the adjusting nut or sleeve 232 which is screw-threaded upon that portion of the mandrel beyond the tapered section 100. This sleeve is maintained in its adjusted position by a lock nut 234 which is also threaded upon the mandrel.

The segments of the split expander head 10 ride up upon the tapered mandrel section 100 as the cross head and the mandrel are pulled forwardly, and this action continues until the forward end of the sleeve 232 strikes the segments of the expander head. Thereafter, the pulling force of the chains and cross head are directly transmitted to the expander head by the engagement of the forward end of the sleeve 232 with the head and the expanding parts are then moved to the forward end of their operative path of movement, in unison.

The segments of the expander head 10 are formed as integral parts of a sleeve 236 which extends forwardly around the mandrel to a position adjacent the cross head. This sleeve is closely fitted within a cylindrical bearing member 238 which is in turn closely fitted within the sleeve 240. The latter is fitted within an opening in a boss 242 extending rearwardly from the expander frame 20 as indicated clearly in Figs. 1, 2 and 6 of the drawings. These parts are held in their operative positions by a pin 244 which prevents relative longitudinal movement of these parts while permitting the bearing member 238 to have turning or rotative movement with reference to the sleeve 240.

Fitted within a cylindrical recess in the rearward end of the sleeve 238 is a reaction cap 246 the end of which may engage the tube sheet 16 to take at least a part of the reaction of the expanding operation. The reaction end of the member 246 is formed with a tube receiving recess 248 which may also take a part of the expanding reaction by reason of its contact with the end of the tube.

The forward end of the expander sleeve 236 is screw-threaded and it is received between the internally threaded split sleeve segments 250 and 252. These segments are preferably flanged at their ends so that they may be held in operative position by the depth gage lever block 254 and the co-operating movable block 256. The latter is guided within an opening 258 in the block 254 and it is formed on its lower surface with a circular recess which receives a boss 260. The latter is integral with the depth gage lever 105 which is screw-threaded at its upper portion as indicated in Figs. 2 and 3 so as to permit the loosening of the forward end of the expander sleeve 236 within the split sleeve segments 250 and 252 for the purpose of adjusting the expander sleeve longitudinally with reference to the lever 105 and thereby varying the length of the path of operative movement of the expander head 10. After such adjustment is made the lever 105 is turned to raise the movable block 256 and again grip the expander sleeve between the split sleeve segments 250 and 252.

Because of the circumferential spaces between the adjacent segments of the expander head the first expanding pass within a given tube may leave metallic ridges of the tube metal at the positions of those spaces, and for that reason it is desirable to turn the expander sleeve through a predetermined number of degrees after the original expanding operation in each tube, to maintain the expander sleeve in such a predetermined angular position, and then to repeat the expanding operation in the same tube to remove the ridges. For this purpose the depth gage lever 105 may be swung from its full line position as indicated in Fig. 3 to its dotted line position, and this swinging movement is limited by reason of the arrangement of the elements particularly indicated in Figs. 2, 3, and 6.

Some of these elements constitute means for holding the split expander head stationary at the starting position in the tube until the ball head is fully expanded due to travel of the tapered portion of the mandrel. For this purpose the block 254 is formed with the arcuate cam or latch portions 264—267, inc. The cam surfaces of these portions co-operate with similarly inclined cam surfaces 268 and 269 at the inner ends of the latch members 270 and 271, respectively. These latch members are spring-pressed toward their inner positions by reason of their mounting which is particularly illustrated in Fig. 6. Each latch member is slidable within a sleeve or cylinder 272 which is screw-threaded into the frame 20 and each carries a collar 273 fixed thereto and slidable within the sleeve. Surrounding each member is a coil spring such as that shown at 274 in Fig. 6, each spring being compressed between the collar 273 and a stop 275 fixed to the outer end of the sleeve.

The cam elements 264—267, inc., are spaced so as to form the notches 276 and 277 (see Fig. 3). These notches permit the block 254 to be moved to the left (see Fig. 2) toward its extreme position by allowing the block to pass beyond the latch members 270 and 271 when they register with the notches 276 and 277. Thereafter, the lever 105 is swung to such a position as that indicated in full lines in Fig. 3 so that the latch members 271 and 270 will engage the cam members 264 and 266 to releasably hold the ball head 10 in its starting position near the inner surface of the tube sheet 16. When the expanding head is fully expanded by the movement of the tapered portion 100 of the mandrel therethrough the increased load will cause the cam surfaces of the latch members 270 and 271 to ride up on the corresponding surfaces of the cam elements 264 and 266 so that the latches are automatically disengaged. The block 254 with the depth gauge lever 105 may then be moved to the right (see Fig. 2) with the cross head until one expanding pass is completed. Thereupon, the depth gauge lever is swung to its vertical position so that the notches 276 and 277 may permit the lever and the block 254 to pass the latches after the mandrel has been returned to the inoperative position at which it is indicated in Fig. 2 of the drawings. Thereupon, the depth gauge lever is swung to the opposite side (or to such a position as that indicated in dotted lines in Fig. 3) in which the cam surfaces 268 and 269 of the cam elements 265 and 267 engage the latches to hold the head 254, as above indicated.

In the relative positions of the elements illustrated in Fig. 3 the pins 278 and 279 act as stops for the turning movement of the block 254 when the depth gauge lever 105 is moved from its vertical position to the position indicated in full lines, similar pins 280 and 281 acting as stops when the lever 105 is swung oppositely. All of these pins are securely anchored circumferentially in the block 254 as indicated in the drawings.

After each expanding operation the expander head is collapsed by holding the expander frame 20 stationary and then pulling the cross head assembly by means of the lever 103 rearwardly as far as possible, thus placing the expander head and the tapered section of the mandrel at their extreme positions away from the reaction cap 246. The forward end of the mandrel, and the expander head are then inserted in the tube by moving the expander and its frame manually by continuing the pull on the lever 103 until the reaction cap 246 contacts the tube end or the tube sheet surface.

The cross head may be considered as automatically disengaged from the pulley chains 92 and 94 by means of the coil springs 116 and 118. At the time, in the expanding operation, when the expander head 10 approaches the end of the tube the cams 102 and 104 contact the projecting latches 112 and 114 and carry the plates 200 and 202 along the expander frame. This causes an increase in the spring tension, and when the expander head is disengaged from the tube this spring tension is sufficient to throw the interconnected cams 102 and 104 and the lever 103 counter-clockwise from their upright positions to their downward positions, thus disengaging the cross head from the chains. This automatic disengagement cannot function while the tube expanding is still in progress because, under the expanding load there is sufficient friction between the clutch members 176 and 178 and the chains 92 and 94 to more than counteract the pull of the coil springs upon the latch members.

During the expanding operation the end of the tube preferably engages the bottom of the tube recess in the reaction cap 246, and this cap is held tightly in this position by the force exerted in the expanding operation, since the expander pulling mechanism is not otherwise anchored. This results in an expansion of the tube without any appreciable lengthening of its expanded portion, and the reaction cap 246 also acts as a centering device for the expander, the tube, and the tube sheet.

For checking the proper degree of tube expanding, which has been previously determined by tests, a recording watt meter or ammeter 300 (see Figs. 10 and 11) is connected to the motor, and the chart on this meter will give a permanent record of all of the expanding operations. In addition, an indicator 302 set by adjustable relays 304 and 306 and controlled by motor load is provided to notify the operator by means of a light or an audible alarm of any tubes which might be over or under expanded due to variation in tube wall thickness, or other physical variations. Since the expanding is done at a constant speed with a motor drive the meter readings and signals are not affected by variable friction.

Whereas the invention has been described with reference to the particular embodiment illustrated in the drawings, it is to be appreciated that it is not limited to all of the details thereof. It is rather of a scope commensurate with the scope of the subjoined claims.

What is claimed is:

1. A tube expander comprising, in combination, a long rod-like mandrel having a conically tapered section integral therewith, an expansible tubular sleeve mounted on the mandrel in telescopic relation thereto, the sleeve being split throughout a substantial part of its length to form spring segments extending from the annular and unitary end of the sleeve toward the tapered section of the mandrel, each segment terminating in a part of an expander head through which the tapered section of the mandrel is longitudinally movable, mandrel pulling mechanism for causing the tapered section of the mandrel to expand said head and thereafter move the expanded head through a tube end, devices for moving the expander from one tube to another, means including said devices for supporting said mandrel and pulling mechanism as a unit so that as the unit is moved from one tube to another the successive positions of the expander mandrel are in parallelism, and manually operable means for turning the split expander sleeve with reference to an expanded tube so that the openings between different segments of the split sleeve will be at angular positions removed to a predetermined extent from their original positions.

2. In a tube expander, a tube expanding head, and means for pulling the head through a part of the tube, said means including a power source and connections between said source and the head, and means controlled by the frictional resistance of said head against the tube metal for acting upon said connections to interrupt the movement of the head longitudinally of the tube at the moment said frictional resistance ceases.

3. In an expander of the pull type, a collapsible expander head, a mandrel extending through said head in such a manner that both the mandrel and the collapsed expander may be freely inserted within a tube end, said mandrel being a long rod-like element having a tapered portion extending through said head, motor driven sprocket chain for exerting a pull on the mandrel to expand the head and thereafter pull it through the tube and toward its nearest end, means under manual control for effecting operative engagement between the mandrel and the sprocket chain, and means for automatically interrupting the connection between the sprocket chain and the mandrel immediately upon the disengagement of the expander head from the tube end.

4. In an expander of the pull type, an expansible and contractable expander head, a mandrel extending through said head in such a manner that both the mandrel and the collapsed expander may be freely inserted within a tube end, said mandrel being a long rod-like element having a tapered portion adapted to expand said head, motor driven means for exerting a pull on the mandrel to expand the head and thereafter pull it through the tube and toward its nearest end, means under manual control for effecting operative engagement between the mandrel and the motor driven means, and means for automatically interrupting the operative connection immediately upon the disengagement of the expander head from the tube end.

5. In a tube expander mechanism; an expansible and contractable expander head; a mandrel extending through said head in such a manner that both the mandrel and the collapsed expander may be freely inserted in a tube end fitted within a tube seat; said mandrel being a long rod-like element having a tapered portion adapted to expand said head; motor operated means for exerting a pull on the mandrel to expand the head and thereafter pull it through the tube and toward its nearest end; means whereby the mandrel, expander head, and motor operated means are associated in a rigid unit; supporting and guiding means for said unit including a vertically adjustable guideway maintaining the expander head and the mandrel assembly with its longitudinal axis in one of several projecting positions in any one of which that axis is substantially co-incident with the longitudinal axis of a tube to be expanded, means under manual control for effecting operative connection between the mandrel and the motor operated means; and means for automatically interrupting the operative connection immediately upon the disengagement of the expander head from the tube end.

6. In a tube expander mechanism; an expansible and contractable expander head; a mandrel extending through said head in such a manner that both the mandrel and the collapsed expander may be freely inserted within a tube end; said mandrel being a long rod-like element having a tapered portion adapted to expand said head; motor operated means for exerting a pull on the mandrel to expand the head and thereafter pull it through the tube and toward its nearest end; means associating the head, mandrel, and motor operated means as a portable unit; guide means along which the unit is shiftable from one tube to another while maintaining the axis of the mandrel in a single plane; means under manual control for effecting operative connection between the mandrel and the motor operated means; and means for automatically interrupting the operative connection immediately upon the disengagement of the expander head from the tube end.

7. In apparatus for expanding the ends of tubes extending through a tube sheet, an expanding tool including a sectional expansible head and a mandrel operable through that head to expand the head and the enclosing tube, a mechanical mandrel operator, mechanism for connecting the mandrel and the operator so that the mandrel is pulled through the expansible head and the expanded head is subsequently pulled through the tube to expand it, means for automatically interrupting the driving connection between the mandrel and the operator at the instant of disengagement of the expansible head and the tube, and means for partially rotating the expansible head before it is moved into the tube for the effecting of a second expanding pass to remove a rib or ridge of tube metal left after the first expanding pass.

8. A tube expander comprising, in combination, a mandrel, a split sleeve expander head mounted on the mandrel, the sleeve being split throughout a substantial part of its length to form spring segments extending from the annular and unitary end of the sleeve, each segment terminating in a part of the head expanded by the mandrel, mandrel pulling mechanism for causing the mandrel to expand said head and thereafter move the expander head through a tube end, and means for turning the split expander sleeve with reference to an expanded tube so that the openings between different segments of the split sleeve will be at angular positions removed to a predetermined extent from their original positions.

9. In a tube expander of the pull type, an expansible head insertable in a tube before the latter is expanded, a rod-like mandrel adapted to expand the head and thereby expand the tube, operating mechanism by which the mandrel is pulled through the head and axially toward the adjacent end of the tube, a carrier combining the expander and its operating mechanism in a unit with the expander and its mandrel rigid therewith and projecting therefrom, a carrier support maintaining the mandrel in successively parallel positions while the carrier is moved to positions confronting different tube ends, a a linear guideway on one of the carrier members extending in one direction, guideway engaging means on the other of the carrier members engaging the linear guideway whereby the carrier is movable relative to the carrier support only in said one direction, another support for supporting said carrier support, a second linear guideway on one of the latter two supports extending in a direction transverse to the first-named direction, second guideway engaging means on the other of said latter two supports engaging the second linear guideway, whereby said carrier support is movable relative to said other support only in a direction transverse to the first-named direction, one of said directions being that of the axis of the tube to be expanded, and a stop for limiting the movement of the carrier in the direction towards the tube.

10. In a tube expander of the pull type, an expansible head insertable in a tube end before the latter is expanded, a rod-like mandrel adapted to expand the head and thereby expand the tube, operating mechanism by which the mandrel is pulled through the head and axially toward the adjacent end of the tube to expand it, a carrier combining the expander and its operating mechanism as a unit with the expander and its mandrel rigid therewith and projecting therefrom, a carrier support maintaining the mandrel in successively parallel positions while the mandrel is moved to positions confronting different tube ends, a linear guideway on one of the carrier members extending in the direction of the axis of the tube to be expanded, guideway engaging means on the other carrier member engaging the linear guideway whereby the carrier is movable relative to the carrier support only in the direction of the axis of the tube, means on the carrier for engaging an abutment whereby to limit the movement thereof towards the tube, another support for supporting said carrier support, a second linear guideway on one of the latter two support members extending transverse to the axis of the tube, and guideway engaging means on the other of said latter two supports engaging the second linear guideway, whereby said carrier support is freely movable to adjust itself transversely of the axis of the tube as the mandrel is pulled through the tube.

11. In a tube expander of the pull type, an expansible head insertable in a tube before the latter is expanded, a rod-like mandrel adapted to expand the head and thereby expand the tube, a roller mounted carrier combining the expander and its operating mechanism in a unit with the expander and its mandrel rigid therewith and projecting therefrom, a carrier support maintaining the mandrel in successively parallel positions while the carrier is moved to positions confronting different tube ends, a trackway on the carrier support extending in the direction of the axis of the tubes to be expanded, whereby the carrier may roll on said carrier support only in the direction of the axes of the tubes, said carrier support also having rollers thereon, another support having a trackway thereon extending transverse to the axes of the tubes, whereby the carrier support may roll thereon only transversely of said axes, and a stop on the carrier for limiting the movement thereof towards the tubes.

12. In a pull type expander, an expander head insertable in tube ends, a mandrel to expand the head, operating mechanism by which the mandrel is pulled partially through the head and toward the adjacent ends of the tubes to expand them, an expander carrier associating the expander and the operating mechanism therewith as a unit and maintaining the mandrel projecting therefrom, a stop limiting the movement of the carrier toward a tube end, a carrier support freely translatable transversely of the tubes and in confronting relation thereto, roller supports taking the load of the carrier support, first guideway elements extending in a direction substantially normal to the longitudinal axes of the tubes to provide a corresponding guideway for said roller supports, the roller supports and first guideway elements being disposed operatively between the carrier and the carrier support, and second carrier guideway elements associated with the carrier and the carrier support and extending in the direction of the tubes and normal to the direction of said first mentioned guideway elements.

13. In an expander of the pull type, an expansible head insertible in tube ends before it is expanded, a long rod-like expanding mandrel movable through said head, a carrier for said head and mandrel including operating mechanism by which the mandrel is pulled partially through the head and towards the adjacent ends of the tubes to expand them, a full floating mount for said carrier whereby the expander may be moved from one tube to another, and means rigid with the carrier to engage an abutment fixed with respect to the tube for limiting the movement of said carrier towards the tubes, whereby said carrier may shift in response to the pulling force of said mandrel to align said head with the axes of the tubes.

14. In an expander of the pull type, an expansible head insertible in tube ends before it is expanded, a long rod-like expanding mandrel movable through said head, a carrier combining the expander and its operating mechanism in a unit with the expander and its mandrel rigid therewith and projecting therefrom, a universal mount for said carrier, including means for maintaining the mandrel substantially parallel to the axes of the tubes, whereby the expander may be moved from one tube to another in parallelism, and a stop on said carrier for engaging the face of a substantially fixed abutment portion transverse to the tube axes so as to limit the movement of said carrier towards said tubes without restraining the lateral movement of the carrier, said stop co-acting with said operating mechanism for shifting said carrier to align said mandrel and head with the tube being expanded, in response to the pulling force exerted by said mandrel.

EDWARD ALEXANDER DEWALD.